United States Patent [19]
Kessler et al.

[11] 3,805,859
[45] Apr. 23, 1974

[54] DELIMBING ASSEMBLY FOR A TREE HARVESTER

[75] Inventors: Kenneth Quentin Kessler; Alvin Lewis Menzel; Stanley Robert Hiseler, all of Dubuque, Iowa

[73] Assignee: Deere & Company, Moline, Ill.

[22] Filed: Mar. 19, 1973

[21] Appl. No.: 342,455

[52] U.S. Cl. .................................. 144/2 Z, 144/3 D
[51] Int. Cl. ............................................. B27c 9/00
[58] Field of Search ............ 144/2 R, 2 Z, 3 R, 3 D, 144/34 E, 309 AC

[56] References Cited
UNITED STATES PATENTS

| | | | |
|---|---|---|---|
| 3,590,760 | 7/1971 | Boyd | 144/2 Z X |
| 3,586,078 | 6/1971 | Hamilton | 144/3 D |
| 3,572,411 | 3/1971 | Coughran, Jr. | 144/3 D |
| 3,464,468 | 9/1969 | Thompson et al. | 144/3 D |

*Primary Examiner*—Andrew R. Juhasz
*Assistant Examiner*—W. D. Bray

[57] ABSTRACT

An articulated, four-wheel drive tree harvesting machine includes a front frame section upon which a felling boom assembly, a delimbing assembly and a feed assembly are mounted. The felling boom assembly is operable for severing a tree and lowering the same into a generally horizontal dispostion from where the trunk of the tree may be released for engagement by feed rolls of the feed assembly and for encirclement by blades of the delimbing assembly. Once a tree is released by the felling boom assembly, the feed rolls may be operated to draw the tree trunk through the delimbing blades while the felling boom may be operated to sever and position a second tree. The delimbing blades of the delimbing assembly are carried on a subframe which is pivotally mounted on a blade support frame for movement about a horizontal axis while the blade support frame is pivotally mounted on the front frame section of the machine for movement about a vertical axis, the structure of the delimbing assembly making it possible for the delimbing blades to keep in proper alignment with a tree trunk encircled thereby.

8 Claims, 4 Drawing Figures

3,805,859

DELIMBING ASSEMBLY FOR A TREE HARVESTER

BACKGROUND OF THE INVENTION

The present invention relates to tree harvesting machines and more particularly relates to harvesting machines of a type including delimbing blades for encircling and removing the limbs from a tree trunk as the latter is fed therethrough by a feed means.

The prior art includes machines of the type described in the preceding paragraph; however, these machines are not entirely satisfactory since the delimbing blades are not mounted so as to move up and down and sideways with a tree trunk engaged thereby nor so as to follow bends along the length of a tree trunk. Thus, when tree trunks are fed through known delimbing blades in a direction angled from a preferred feed path, the blades are not oriented so as to embrace the tree trunk evenly about the circumference thereof. Also, bends along the length of a tree trunk cause the known delimbing blades to bridge some areas of the trunk, and leave relatively long limb stubs, and to gouge the tree trunk at other areas along the length thereof.

Accordingly, it is a broad object of the invention to provide a tree harvesting machine which overcomes the disadvantages, noted above, of existing machines. Specifically, it is an object to provide a machine having delimbing blades mounted thereon in such a manner that the blades align themselves with a tree trunk as the latter is being fed therethrough. Still more specifically, it is an object of the invention to provide delimbing blades as described in the previous sentence which are carried by a subframe that is supported on the vehicle frame for pivotal movement relative thereto about a vertical and a horizontal axis.

These and other objects will become apparent from the following description and the appended drawings.

SUMMARY OF THE INVENTION

According to the present invention, there is provided a tree harvesting machine including an articulated frame comprising a rear section on which is located a cab and engine of the vehicle and a front section on which is located felling boom, delimbing and feed assemblies.

The front and rear frame sections are each supported on a pair of driven ground wheels and the delimbing and feed assemblies are arranged such that a tree trunk being delimbed passes generally longitudinally of the machine along a predetermined path extending generally horizontally over one of each of the front and rear pairs of wheels and next to one side of the cab and engine.

The delimbing assembly is located on the forward end of the front frame section and includes delimbing blades mounted on a subframe which is pivotally mounted on a blade support frame for movement about a horizontal axis, the blade support frame in turn being mounted on the front frame section of the vehicle for movement about a vertical axis. The feed assembly is located just rearwardly of the delimbing blades and includes a pair of feed rolls located at opposite sides of and for feeding a tree trunk along the predetermined path. A tree support member is formed integrally with a vertically swingable stacking blade mounted on the rearward end of the rear frame section, the tree support serving to support a tree trunk of a tree being pulled through the delimbing blades.

The felling boom assembly includes an articulated boom structure to the end of which a felling head is connected and the felling head and boom structure are operable for shearing a tree trunk and introducing the same into the feed rolls and delimbing blades.

DESCRIPTION OF THE PREFERRED EMBODIMENT

Preliminary to the description, it is to be noted that expressions contained herein such as "front," "rear," "forward," "rearward," "right-hand," "left-hand," "inner" and "outer" are made from the viewpoint of an operator seated in the cab of the machine and facing in the forward direction of travel thereof.

Figure 1:
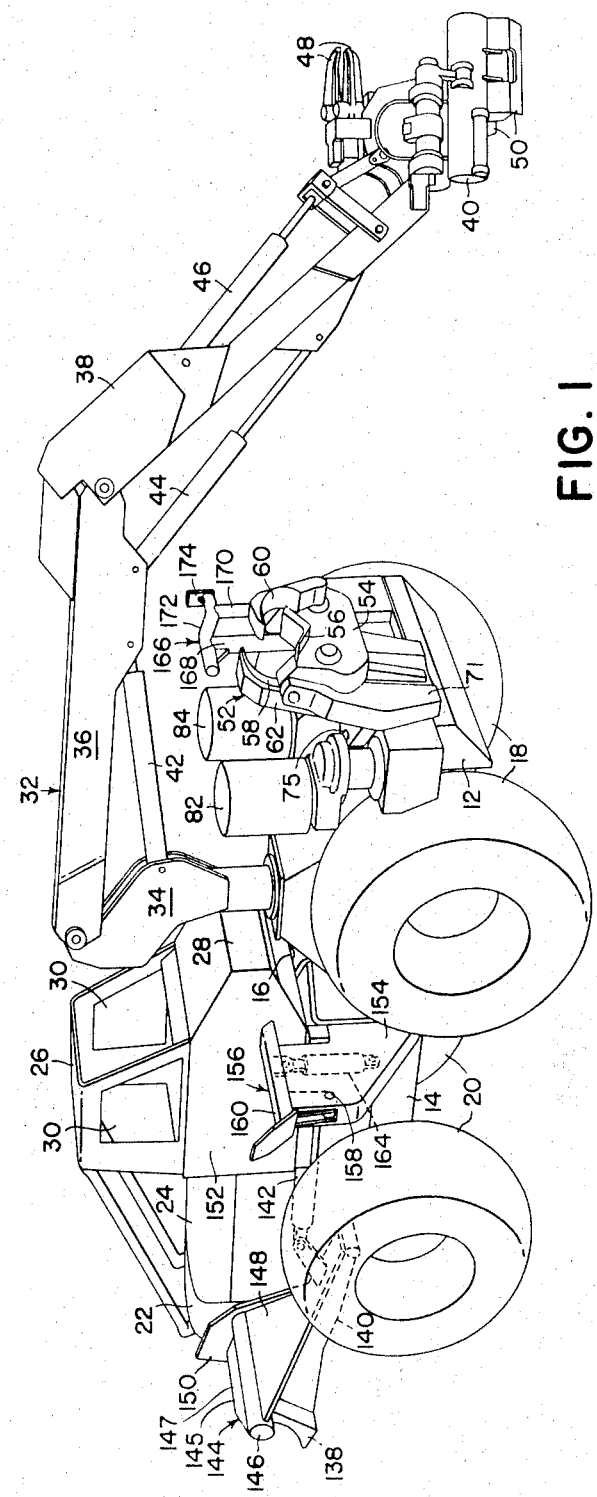
FIG. 1 is a perspective overall view of a tree harvesting machine constructed according to the principles of the present invention.
Figure 2:
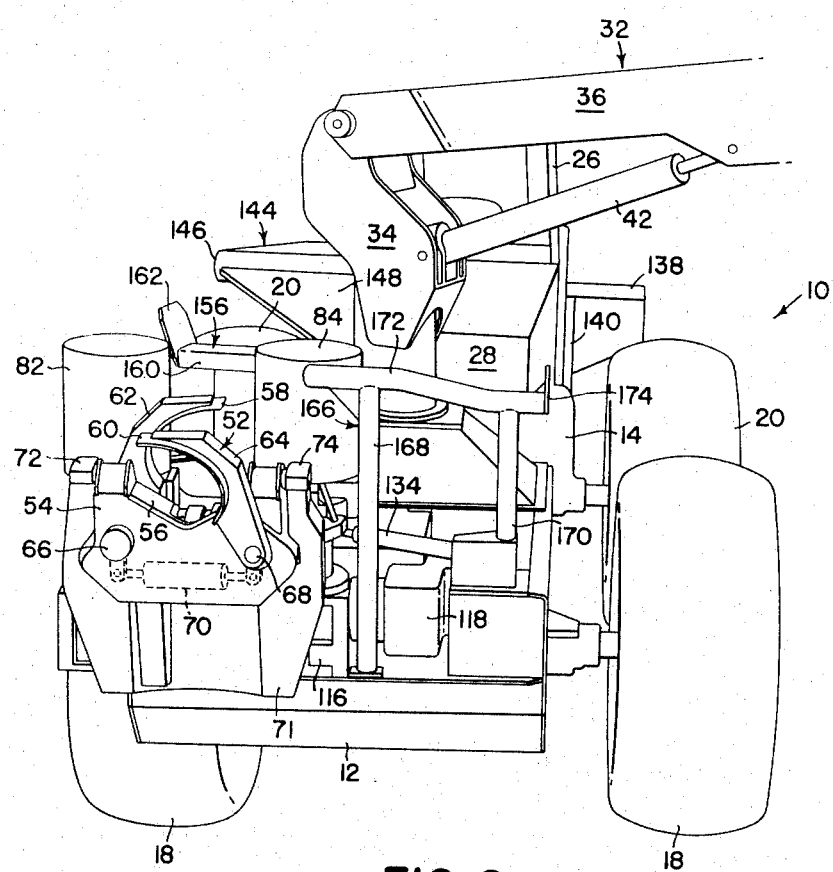
FIG. 2 is a rear perspective view of the machine shown in FIG. 1 but showing only a portion of the felling boom assembly.

Referring now to FIGS. 1 and 2, therein is shown a tree harvesting machine indicated in its entirety by the reference numeral 10. The machine 10 is constructed so as to be highly maneuverable in most conditions of terrain found in forested areas and for this purpose includes an articulated chassis comprising front and rear frame sections 12 and 14, respectively, which are connected together for relative movement about a vertical pivot axis defined by pin means, shown partially at 16. The front and rear frames are supported by front and rear pairs of driven ground wheels 18 and 20, respectively.

Mounted centrally on the rearmost portion of the rear frame section 14 is a radiator housing 22 in which a radiator and other components, not shown, are located. Forming a forward continuation of the radiator housing 22 is an engine housing 24 in which an engine, not shown, is located. The forward end of the engine housing 24 terminates at the rearward wall of a cab 26 which is mounted on the foremost portion of the rear frame section 14 and includes a nose 28 overlying the pivot pin 16. The cab 26 is provided with a plurality of windows, indicated at 30, located so as to permit an operator seated in the cab to see operation of various components of the machine as will be apparent from the following description.

Mounted on the rear portion of the front frame section 12 just forwardly of the pivot pin 16 is a shear or felling boom assembly 32. The shear boom assembly comprises an upright support post 34 that is journaled in the front frame section for rotation about a vertical axis. Hydromechanical drive means (not shown) are connected to the lower end of the post 34 for selectively rotating the same. A first boom section 36 has opposite ends respectively pivotally connected to the upper end of the post 34 and to one end of a second boom section 38 for swingable movement about respective parallel horizontal axes. A felling head 40 is in turn pivotally connected to the other end of the boom section 38 for pivotal movement about a generally horizontal axis which is parallel to the last-mentioned axes. A trio of extensible and retractable hydraulic actuators 42, 44 and 46 are mounted between the upright post 34 and the first boom section 36, between the first boom section 36 and the second boom section 38 and between the second boom section 38 and the felling head 40, respectively, for selectively swinging the boom sections and the felling head vertically relative to each other and to the upright post 34. The felling head 40 includes a pair of grapple tongs 48 located above a pair of shear blades 50, the pair of tongs and the pair of shear blades each being movable towards and away from each other respectively for grasping and for severing a tree trunk or stem located therebetween.

Mounted on the right-hand side of the forward end portion of the front frame section 12 is a delimbing assembly 52 including a subframe 54 having a V-shaped blade 56 fixed to the top thereof and arranged to support a tree trunk disposed along a predetermined path extending longitudinally of the harvesting machine. Located below and at the right- and left-hand sides of the V-shaped blade 56 are blades 58 and 60, respectively, which cooperate with the V-shaped blade to encircle a tree trunk supported by the V-shaped blades. The blades 58 and 60 are curved so as to approximate the curvature of a tree trunk and are fixed to right- and left-hand arms 62 and 64, respectively, the arms being respectively pivotally connected to the subframe 54 for swinging laterally towards and away from each other about respective fore-and-aft axes defined by rockshafts 66 and 68. The arms 62 and 64 are mounted at the rearward and forward sides, respectively, of the frame 54 so as to sweep overlapping paths located at the leading and trailing edges of the blade 56. Extending between a pair of lugs respectively depending from the rockshafts 66 and 68 is an extensible and retractable hydraulic actuator 70 for selectively swinging the blade-carrying arms 62 and 64 towards and away from each other. To ensure that the blades will be properly disposed with respect to a tree trunk gripped thereby, the subframe 54 is located between and pivotally connected to the opposite legs of a U-Shaped blade support frame 71 for movement about a transverse horizontal pivot axis defined by right- and left-hand journal connections 72 and 74 located at the upper ends of the legs above the V-shaped blade 56, the blade support frame in turn being pivotally mounted on the frame section 12 for swinging about a vertical axis defined by a connection 75 at the rearward side of the frame 71. Thus, the frames 54 and 71 may pivot to align themselves with tree trunks or tree trunk portions which are angled from a predetermined generally horizontal fore-and-aft path so that the blades 58 and 60 are always disposed to cut limbs off as closely as possible to the trunk of the tree. It is to be noted that for some constructions it may be desirable to connect the blade support frame to the front section for movement about an axis inclined from the vertical thus resulting in the subframe being pivotally mounted about an axis similarly inclined from the horizontal.

A tree feed assembly 76 is located rearwardly of the blade assembly 52 for propelling a tree trunk rearwardly when the trunk is encircled by the blades thereby causing the limbs to be cut from the trunk. The feed assembly includes right- and left-hand feed roll structure 78 and 80, respectively. The feed roll structures 78 and 80 include cylindrical feed roll or drums 82 and 84, respectively, which are mounted, in a manner to be described below, for being driven about their respective vertical longitudinal axes and for being swung about respective vertical axes spaced from said longitudinal axes. Although the rolls 82 and 84 are here shown as being smooth surfaced, the rolls would normally be provided with spikes or some other means for aggressively engaging a tree trunk.

For the purpose of driving the feed rolls, the right- and left-hand feed roll structures 78 and 80 include final drive output shafts 86 and 88, respectively, which are fixed to the rolls 82 and 84 and extend along the longitudinal axes thereof. The lower end portions of the output shafts 86 and 88 are journaled for rotation in final drive housings 90 and 92, respectively. Fixed on the lower end portions of the shafts 86 and 88 are driven gears 94 and 96, respectively, which are meshed with pinion gears 98 and 100 that are fixed to the upper end portions of vertically extending final drive input shafts 102 and 104, respectively, the shafts 102 and 104 also being rotatably supported in the respective drive housings 90 and 92. Respectively fixed to the lower ends of the inputs shafts 102 and 104 are driven gears 106 and 108 which are meshed with pinion gears 110 and 112, respectively, the pinion gears being fixed to a horizontally disposed drive shaft 114 rotatably supported in a drive housing 116. For the purpose of selectively driving the rolls 82 and 84 at high or low speeds in either a forward or reverse direction (the forward direction being indicated by the arrows in FIG. 4), there is provided a high-low-reverse transmission of a conventional hydraulically controllable type including a housing shown at 118 and having an output shaft (not shown) connected to the drive shaft 114. Power is fed into the high-low-reverse transmission through means of a power shaft (not shown) connected to the power take-off of the main drive transmission of the machine.

Figure 3:
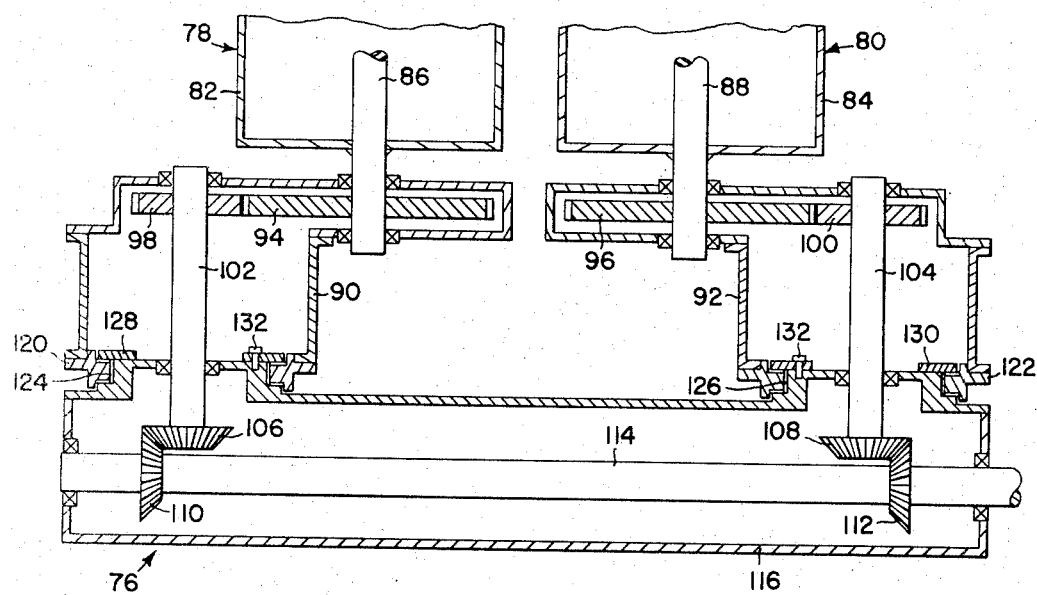
FIG. 3 is a somewhat schematic sectional view of the mounting and drive means for the feed rolls of the feed assembly.
Figure 4:
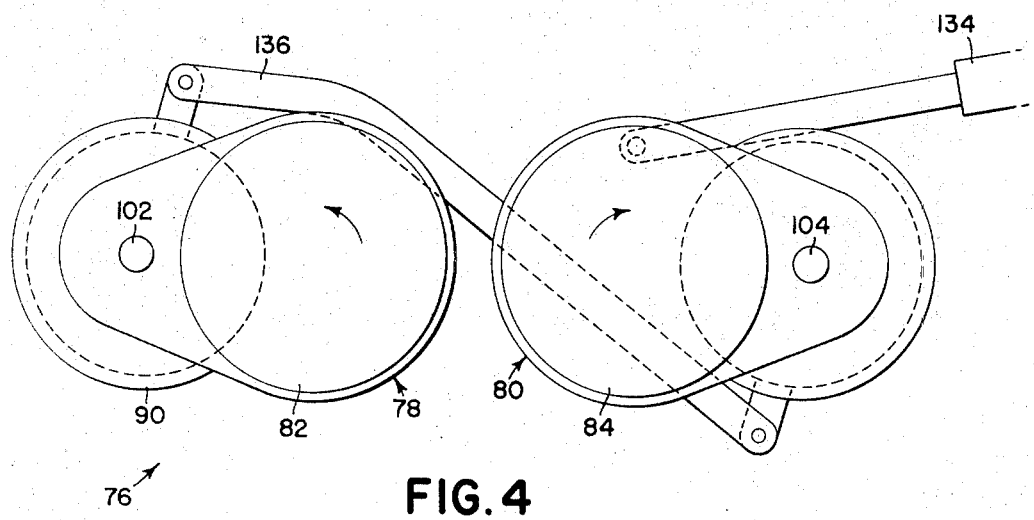
FIG. 4 is a somewhat schematic top plan view of the feed rolls showing the apparatus for causing simultaneous pivoting of the feed rolls about their respective mounting axes.

The final drive housings 90 and 92 are pivotally supported on the top of the drive housing 116 for swingable movement about respective axes extending coaxially of the final drive input shafts 102 and 104. This connection of the drive housings 90 and 92 with the housing 116 is made through means of respective annular wear rings 120 and 122 which are respectively seated on annular, stepped bearing surfaces 124 and 126 formed on the housing 116. The wear rings are held in place by respective fastener rings 128 and 130 which overlie a portion of the wear rings and are secured to the drive housing 116 through means of a plurality of screws 132. The rolls 82 and 84 are swung symmetrically, relative to the above-mentioned predetermined, longitudinally extending path along which a tree trunk being delimbed normally passes, through means of an extensible and retractable hydraulic actuator 134 having its cylinder end connected to the frame and having its rod end pivotally connected to the final drive housing 92, and through means of a tie rod 136 having its opposite ends pivotally connected to the drive housings 90 and 92. The drive rolls 82 and 84 may thus be swung between a moved together position, as shown in FIGS. 3 and 4, and a separated position by retracting the hydraulic actuator 134 to swing the final drive housing 92 clockwise which in turn causes the tie rod 136 to be moved so as to swing the final drive housing 90 counterclockwise from the positions shown in FIG. 4.

It is here noted that both the hydraulic actuator 70 and the actuator 134 are preferably connected in a closed-center hydraulic system capable of maintaining sufficient pressure at the actuators for keeping the delimbing blades and the feed rolls engaged with a tree trunk extending therebetween.

Mounted at the rearward end of the tree harvesting machine 10 is a conventional vertically adjustable stacking blade assembly including a transversely extending blade 138 fixed integrally with a pair of forwardly extending push arms 140 having their forward ends pivotally connected to the opposite sides of the rear frame section 14. The push arms 140 are raised and lowered vertically about their connection with the main frame through means of a pair of hydraulic actuators, one being shown at 142. Secured to the righ-hand end portion of the blade 138 and the right-hand push arm 140 at a location in fore-and-aft alignment with the path traveled by a tree being delimbed is a tree support member 144 arranged for supporting a tree as it is being delimbed so that the tree remains in a generally horizontal position. The tree support member 144 includes a generally horizontal structure 145 fixed at its underside to the upper portion of the blade 138 and including an intermediate horizontally disposed generally cylindrical member 146 from which extends downwardly and rearwardly inclined and downwardly and forwardly inclined gusset-like deflector plates 147 and 148, respectively. The inner end of the structure 143, hence the inner end of the cylindrical member 146 and the inner edges of the deflector plates 147 and 148 are fixed to a vertical guide plate 150 which extends alongside the rear frame section 14 and has its lower edge fixed to the adjacent push arm 140. Thus, it will be appreciated that the tree support member 144 may be adjusted vertically to properly dispose it for supporting a tree trunk being delimbed, such adjustment of course being necessary to accommodate different sizes of trees and to allow for crooked tree trunks and for the downward sagging of limber tree trunks.

It is here noted that the right-hand side of the cab 26, as indicated at 152, is positioned so as to deflect outwardly any tree trunks which might have a tendency to travel inwardly because, for example, of their crookedness.

A further structure for supporting and handling tree trunks during and after delimbing is secured to the rear frame section 14 in the vicinity of the cab side 152 and comprises a bracket 154 formed from transversely extending vertical, fore-and-aft spaced plates having horizontal top surfaces and vertical outer surfaces. A retainer-ejector arm 156 is vertically pivotally connected to the bracket 154, as at pin 158. The retainer-ejector arm 156 is angular in shape and includes a support section 160 and a guide plate section 162, the arm being swingable between a support position, as illustrated, wherein the support section 160 extends horizontally from the cab side 152 over the top of the bracket 154 and terminates at the guide plate 162 which extends upwardly therefrom, and a dump position wherein the support section 160 is disposed generally vertically at the outer side of the bracket 154, the guide plate section 162 then being angled outwardly and downwardly from the machine. Connected between the arm 156 and the bracket 154 for moving the arm between its support and dump positions is an extensible and retractable hydraulic actuator 164. Thus, it will be appreciated that if the weight distribution of a tree trunk being delimbed is not such that the majority of the trunk weight is rearwardly of the tree support member 144 by the time that the trunk has passed through the feed rolls 82 and 84, the retainer-ejecton arm can be swung to the dump position to deposit the delimbed tree trunk to the right-hand side of the machine 10.

A tree support member 166 is fixed to the left-hand front portion of the front frame section 12 and serves to act in combination with the grapple tongs 48 of the shear boom assembly to support a felled udelimbed tree, for a purpose not pertinent here. The support member 166 includes a pair of transversely-spaced upright supports 168 and 170 to the tops of which are secured a cross member 172 having a plate 174 welded at its left-hand end and being curved downwardly betweeen an intermediate location and the left-hand end.

In operation, the delimbing machine 10 is moved to a logging site either by driving or by hauling. Once at a harvesting site, the tree harvesting machine 10 is driven adjacent to a tree to be felled and the operator then controls the shear or felling boom assembly 32 so as to position the shear head 40 against a tree, the grapple tongs 48 then being closed upon the tree and the shear blades then being operated to shear the tree. Once the tree is sheared, the hydraulic actuators 42, 44, and 46 are actuated so as to tilt the tree to a generally horizontal position and to position the butt portion of the tree, now located in the shear head, to a position above and between the two feed rolls 82 and 84 and the two delimbing blades 58 and 60, the rolls and blades being in respective open positions wherein they are spread apart from each other. The tree is then released from the shear head by opening the grapple tongs 48 and the thus released tree falls upon the V-shaped delimbing blade 56. The hydraulic actuator 70 is then extended to cause the blades 58 and 60 to be pressure engaged with the trunk of the tree, the blades 58 and 60 then cooperating with the V-shaped blade 56 to encircle the tree trunk. The blades 56, 58 and 60 will now be closely adjacent to the trunk since the subframe 54 will have pivoted about the axis defined by the journals 72 and 74 and the blade support frame 71 will have pivoted about the axis 75 so as to keep the pivot axes of the blade arms more or less parallel to the length of the tree section at the location engaged by the blades and this parallelism is, in a like manner, maintained while the tree trunk is being fed therethrough even though the trunk may at times be angled up or down or sideways from the desired path.

The tree trunk is fed through the blades by first extending the hydraulic actuator 134 to effect the closing of the feed rolls 82 and 84 upon the tree trunk and then by actuating the feed roll drive into a forward driving mode and engaging the same to drive the feed rolls 82 and 84 to pull the tree trunk through the delimbing blades 54, 58 and 60.

AS the tree trunk is propelled rearwardly, it first passes over the retainer-ejector arm 156, which is now in its support position, and then passes on over the tree support member 144. If the tree trunk is crooked and is disposed in the feed rolls such that it travels towards the cab 26, the cab side 152 will fend the oncoming tree off its course and cause it to proceed in the desired fore-and-aft direction. Once the tree trunk has passed through the feed rolls 82 and 84, the weight of the tree portion rearwardly of the tree support member 144 will normally be sufficient to cause the tree to tilt downwardly so that the butt end portion thereof rests on the ground at the rear of the harvesting machine. Then as the tree harvesting machine is driven forwardly, the tree will normally drop in place. In the event that that portion of the tree rearwardly of the support member 144 is not heavy enough to cause the tree to tilt downwardly, the tree trunk may be deposited to the right-hand side of the machine by extending the hydraulic actuator 164 to effect the movement of the retainer-ejector arm 156 from its support to its dump position.

We claim:

1. A tree delimbing device comprising: a base frame, a delimbing blade support frame being pivotally mounted on said base frame for movement about a first axis; a subframe being pivotally mounted on said support frame for movement about a second axis extending generally crosswise to the first axis; and delimbing blade means being mounted on said subframe for movement between a first position for receiving a tree stem, extending substantially perpendicular to said second axis, and a second position for encircling a received tree.

2. The tree delimbing device defined in claim 1 wherein said first axis and said second axis are respectively generally vertical and horizontal; said delimbing blade means including an upwardly opening, generally V-shaped blade fixed to said subframe and right- and left-hand blades pivotally mounted on said subframe for movement towards and away from each other and said V-shaped blade about respective axes extending crosswise to said second axis.

3. The tree delimbing device defined in claim 2 wherein said respective axes are below said second axis.

4. The tree delimbing device defined in claim 2 and further including tree feed means mounted on said base frame adjacent said delimbing blade support frame and arranged for advancing a tree encircled by said delimbing bldade means along a path extending crosswise to said second axis.

5. The tree delimbing device defined in claim 4 wherein said tree feed means includes right- and left-hand feed rolls pivotally mounted on said base frame for movement towards and away from each other and a path extending crosswise to said second axis and being bounded by said delimbing blade means.

6. A tree delimbing device comprising: a ground-supported base frame, a subframe, delimbing blade means mounted on said subframe for movement between first and second positions for respectively receiving and encircling a tree stem to be fed lengthwise through the delimbing blade means along a path extending generally parallel to the ground; and means supportingly connecting said subframe to said base frame for pivotal movement about a horizontal axis and a vertical axis.

7. The tree delimbing device defined in claim 6 wherein said means supportingly connecting said subframe to said base frame includes a blade support frame which is U-shaped as viewed in the direction of such path and thus includes a pair of sapced, upwardly extending legs; said subframe being located between and connected to said legs by first connection means defining said horizontal axis; and said blade support frame being connected to said base frame by second connection means defining said vertical axis.

8. The tree delimbing device defined in claim 7 wherein said first connection means is disposed at a level above said second connection means.

* * * * *